United States Patent
Anderson et al.

(10) Patent No.: US 12,501,370 B2
(45) Date of Patent: Dec. 16, 2025

(54) ADAPTIVE RADIO TRANSMIT POWER BASED ON ANTENNA/DEVICE ORIENTATION

(71) Applicant: Cisco Technology, Inc., San Jose, CA (US)

(72) Inventors: Fred Jay Anderson, Lakeville, OH (US); John Matthew Swartz, Lithia, FL (US); Jerome Henry, Pittsboro, NC (US); Robert Edgar Barton, Richmond (CA); Matthew Aaron Silverman, Shaker Heights, OH (US); Danielle N. Bane, Cleveland, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 532 days.

(21) Appl. No.: 17/977,329

(22) Filed: Oct. 31, 2022

(65) Prior Publication Data
US 2024/0147383 A1  May 2, 2024

(51) Int. Cl.
*H04W 52/28* (2009.01)
*H04W 52/36* (2009.01)

(52) U.S. Cl.
CPC ....... *H04W 52/283* (2013.01); *H04W 52/367* (2013.01)

(58) Field of Classification Search
CPC ............. H04W 52/283; H04W 52/367; H04W 52/143
See application file for complete search history.

(56) References Cited

U.S. PATENT DOCUMENTS

| | | | |
|---|---|---|---|
| 8,989,792 B1* | 3/2015 | Depew | H04B 1/3838 455/575.4 |
| 10,433,260 B1* | 10/2019 | Krishnamachari | H04W 52/26 |
| 2013/0156080 A1* | 6/2013 | Cheng | H04M 1/72454 375/267 |
| 2014/0128032 A1* | 5/2014 | Muthukumar | H04W 52/0254 455/412.2 |
| 2014/0333499 A1 | 11/2014 | Fang et al. | |
| 2015/0357708 A1 | 12/2015 | Au | |
| 2020/0169963 A1 | 5/2020 | Desclos et al. | |
| 2021/0066785 A1 | 3/2021 | Rosenthal et al. | |

(Continued)

FOREIGN PATENT DOCUMENTS

JP       2010041250 A       2/2010

OTHER PUBLICATIONS

International Search Report and Written Opinion for International Application No. PCT/US2023/077614, mailed Feb. 13, 2024, 15 Pages.

(Continued)

*Primary Examiner* — Fayyaz Alam
(74) *Attorney, Agent, or Firm* — Edell, Shapiro & Finnan, LLC

(57) ABSTRACT

A method for providing adaptive radio transmit power based on antenna pattern and elevation tilt measured through an accelerometer is provided. The method includes estimating an orientation of a wireless device using an orientation sensor integrated in or on the wireless device, and determining an adjustment factor for a transmitter of the wireless device based on the orientation. The method further includes adjusting output power of the transmitter of the wireless device based on the adjustment factor.

21 Claims, 9 Drawing Sheets

(56) References Cited

U.S. PATENT DOCUMENTS

2022/0248344 A1    8/2022  Kalavakuru et al.
2022/0295420 A1*   9/2022  Musante ................ H04B 17/12

OTHER PUBLICATIONS

Burton, T. et al., "Orientation Estimation using Wireless Device Radiation Patterns," https://arxiv.org/abs/2203.10052, Mar. 18, 2022, 19 pages.

* cited by examiner

ADAPTIVE RADIO TRANSMIT POWER BASED ON ANTENNA/DEVICE ORIENTATION

TECHNICAL FIELD

The present disclosure relates to optimizing transmit power of a wireless transceiver.

BACKGROUND

Effective (or Equivalent) Isotropic Radiated Power (EIRP) is a calculation used to estimate the radiated output power of an isotropic antenna, which is a theoretical half wave dipole antenna that radiates perfectly (distributes power equally) in all directions. The formula for this calculation, shown in equation (1) below, takes into account transmitter output power, cable loss, and antenna gain to determine the maximum power emitted by the antenna in a single direction with the highest antenna gain:

$$EIRP = P_T - L_C + G_a \quad (1)$$

where, EIRP=output power of a signal when it is concentrated into a smaller area by the antenna; $P_T$=Output power of the transmitter (dBm); $L_C$=Cable Loss (dB); and $G_a$=Antenna Gain (dBi). Often, the cable losses $L_C$ can be negligible (small fraction of a dB). Typically, for an antenna radiation pattern measurement, if a single value of EIRP is given, this will be the maximum value of the EIRP over all measured angles. EIRP can also be thought of as the amount of power a perfectly isotropic antenna would need to radiate to achieve the measured value.

According to Federal Communication Commission (FCC) 14-30 Section 15.407, for an outdoor wireless access point operating in the U-NII-1, U-NII-5, and U-NII-7 bands, "The maximum EIRP at any elevation angle above 30 degrees as measured from the horizon must not exceed 125 milliwatts (mW) (21 dBm)." Normally, the access point's maximum transmit power capability is well over this restriction, as high as 36 dBm. Due to this restriction, the radio transmit power of the access point is set based on the total radio frequency (RF)-conducted power and gain of the antenna at 30 degrees above the horizon. However, this is often not considered "optimal". For example, in some deployments, the antenna of the access point is tilted downward, which lowers the antenna's gain at 30 degrees above the horizon according to the roll off the main lobe.

DETAILED DESCRIPTION

Overview

Presented herein are an apparatus and method for providing adaptive radio transmit power based on antenna pattern and elevation tilt measured through an accelerometer. The method includes estimating an orientation of a wireless device using an orientation sensor integrated in the wireless device, and determining an adjustment factor for a transmitter of the wireless device based on the orientation of the wireless device. The method further includes adjusting output power of the transmitter of the wireless device based on the adjustment factor.

Example Embodiments

The regulatory authority (e.g., FCC in the United States, Industry Canada, etc.) mandates that a worst case scenario (i.e., antenna pointed toward the horizon) should be assumed for an EIRP limitation at a predetermined angle (e.g., 30 degrees) above the horizon. This is because of non-enforceability of any other mounting angles which, by lower off-axis antenna gain, would allow more RF-conducted power to be applied.

However, there is an opportunity for an assisted/automatic mode that can open up use cases of all different degrees of downtilt of an antenna radiating power, with automatic adjustment of transmit power to comply with the applicable regulations governing outdoor emitters/transmitters.

Example embodiments described herein provide an access point (AP) configured for assisted optimization of EIRP of the AP, and including an orientation sensor (e.g., an accelerometer, etc.) to estimate the orientation (e.g., tilt) of an antenna (such as a directional antenna), and setting transmit power of a transmitter based on the orientation accordingly to satisfy EIRP restrictions (rather than simply assuming the worst-case scenario of an AP/antenna pointed at the horizon). The overall goal is to obtain the maximum EIRP from access points and other wireless devices based on antenna orientation relative to a predetermined angle above the horizon or some other criteria.

Figure 1:
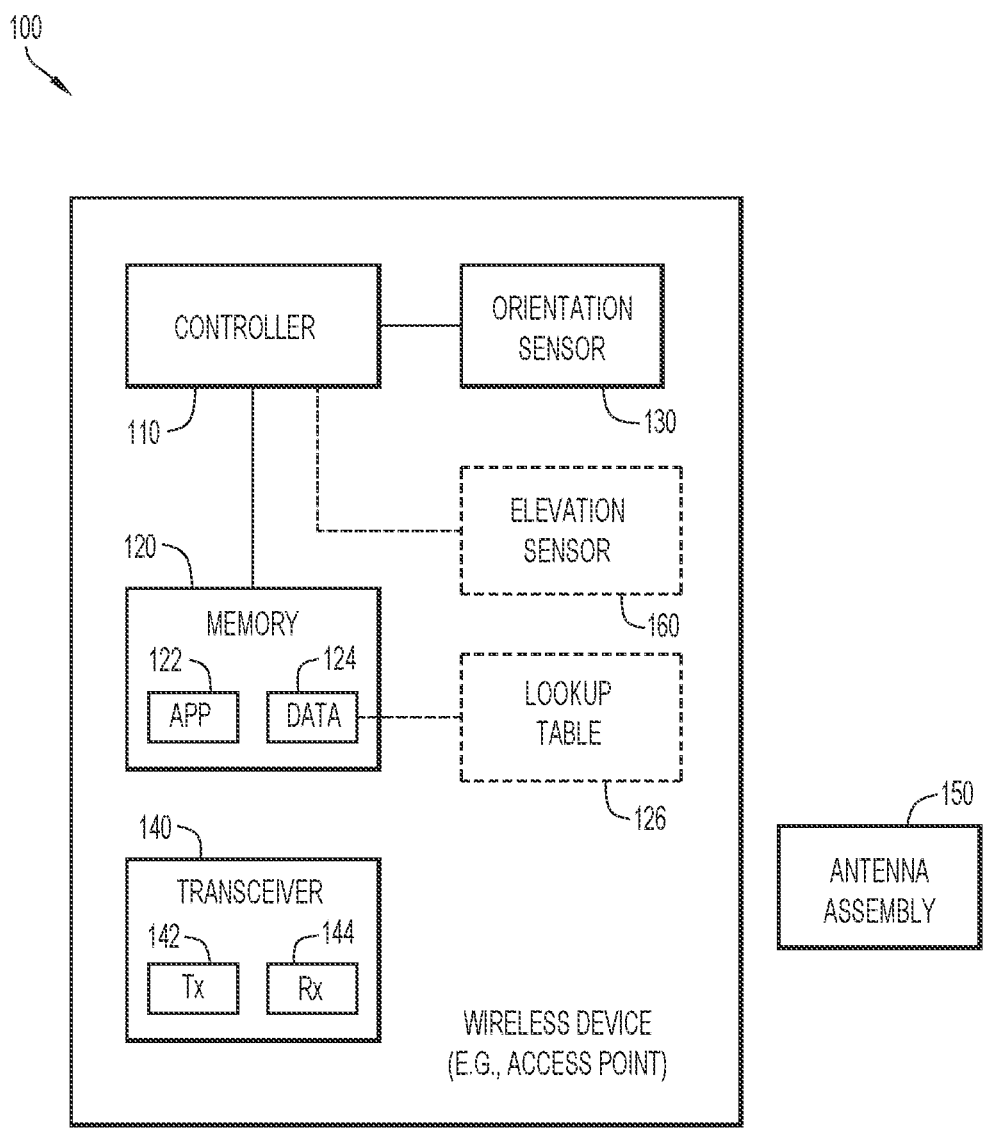
FIG. 1 is a block diagram of an apparatus that is capable of adapting radio transmit power based on antenna pattern and elevation tilt measured through an orientation sensor, according to an example embodiment.

Referring to FIG. 1, FIG. 1 illustrates an apparatus 100 (e.g., an access point or other wireless device with wireless transmit capabilities) configured to adapt radio transmit power based on orientation (e.g., tilt angle) of the apparatus (and of its transmit antenna, in particular) measured by an orientation sensor, according to an example embodiment. As shown in FIG. 1, the apparatus 100 includes a controller 110, a memory 120, an orientation sensor 130, and a transceiver 140. The controller 110 is in communication with the memory 120, the orientation sensor 130, and the transceiver 140. The memory 120 stores computer readable instructions in the form of one or more software programs or applications 122 as well as data 124. The transceiver 140 includes a transmitter (Tx) 142 and a receiver (Rx) 144. The apparatus 100 also includes an antenna assembly 150 (also referred to herein as a directional antenna or simply antenna). In some example embodiments, the apparatus 100 further (optionally) includes an elevation sensor 160 placed on or integrated within the apparatus 100, where the controller 110 is also in communication with the elevation sensor 160.

The controller 110 performs functions associated with operations discussed herein using the one or more software programs (applications) 122 and data 124 stored in the memory 120. The orientation sensor 130 is configured to determine an orientation (e.g., tilt angle) of the apparatus 100 (and/or its antenna assembly 150). The controller 110 is configured to estimate the orientation of the apparatus 100 (antenna 150) using output from the orientation sensor 130, and determine an adjustment factor for the output power of transmitter 142 based on the orientation. The controller 110 is further configured to generate a power adjustment control to adjust output power of the transmitter 142 based on the adjustment factor.

In some example embodiments, the controller 110 is configured to estimate an angle of tilt of the antenna 150 relative to the horizon based on the orientation determined by the orientation sensor 130. The orientation sensor 130 may be a three-dimensional (XYZ) accelerometer, for example. Even if a device is not moving, an accelerometer can detect the orientation (tilt) of a device, by measuring the acceleration due to Earth's gravity, which is a constant downward force acting on all objects. The accelerometer can determine if the object is parallel to the Earth's surface or if it is tilted, and more specifically, can measure the tilt (in degrees). Alternatively, the orientation sensor 130 may be a gyroscope, an inertial measurement unit (IMU), or other similar sensor (now known or hereinafter developed) that is configured to measure the angle of tilt of the antenna 150 relative to the horizon.

In some example embodiments, the controller 110 is configured to determine the adjustment factor by calculating an adjusted output power of the transmitter 142 based on the angle of tilt of the antenna 150. In some other example embodiments, the controller 110 is configured to determine the adjustment factor by correlating the angle of tilt of the antenna 150 of the apparatus 100 against stored data 124 describing an antenna pattern of the antenna in an elevation plane (e.g., a lookup table 126).

In some example embodiments, the controller 110 is configured to generate the power adjustment control so as to increase the output power of the transmitter 142 based on the angle of tilt of the antenna 150 to maximize a radiated power from the antenna 150 up to a predetermined angle above the horizon. The controller 110 is configured to generate the power adjustment control that adjusts the output power of the transmitter 142 to achieve a highest allowable EIRP that does not exceed a maximum EIRP value at a predetermined angle above the horizon according to regulatory restrictions.

In a variation of the apparatus 100 described above that includes the elevation sensor 160 placed on or integrated within the apparatus 100, the elevation sensor 160 is configured to measure an elevation (e.g., height above the ground/floor) of the apparatus 100 (or its antenna 150). In this variation, the controller 110 is configured to determine an elevation of the antenna 150 based on elevation output by the elevation sensor 160, and determine one or more radio frequency (RF) modifications with respect to a target area of the antenna 150 based on the angle of tilt of the antenna 150 and the elevation of the antenna 150. If the target area of the antenna 150 is also known, determining the elevation as well as the tilt can assist with various RF modifications (e.g., based on where the beam being focused, such as the field, a parking lot, etc.). In some example embodiments, these RF modifications may involve further fine tuning of the adjustment factor (and/or the output radio transmit power itself) by the controller 110 to avoid exceeding the EIRP limits at the horizon. Additionally or alternatively, these RF modifications can also include channel selection (via the controller 110) to a channel that may not have elevation angle restrictions on the EIRP per local regulations.

Thus, to determine the orientation of the apparatus 100 (e.g., antenna assembly 150 of an access point or other wireless device) according to example embodiments described herein, an orientation sensor 130 (e.g., an accelerometer or other similar sensor capable of measuring or deriving tilt angle of a device) can be placed onto or integrated within the apparatus 100. This orientation sensor 130 will allow the apparatus 100 to determine the orientation/tilt of its antenna 150. Correlating the orientation of the antenna 150 to the radiation pattern allows the apparatus 100 to optimize the transmit power of its transmitter 142 while still following the relevant restrictions of regulatory authorities.

As mentioned above, in some deployments, the antenna 150 of an apparatus 100 (e.g., a wireless AP) is tilted downward which lowers the antenna's gain G a at 30 degrees above the horizon, according to the roll off the main lobe. This lower gain value (G a) presents an opportunity to increase the output power ($P_T$) of the transmitter 142 to obtain the highest possible EIRP within the appropriate regulatory restrictions.

Figure 2A:
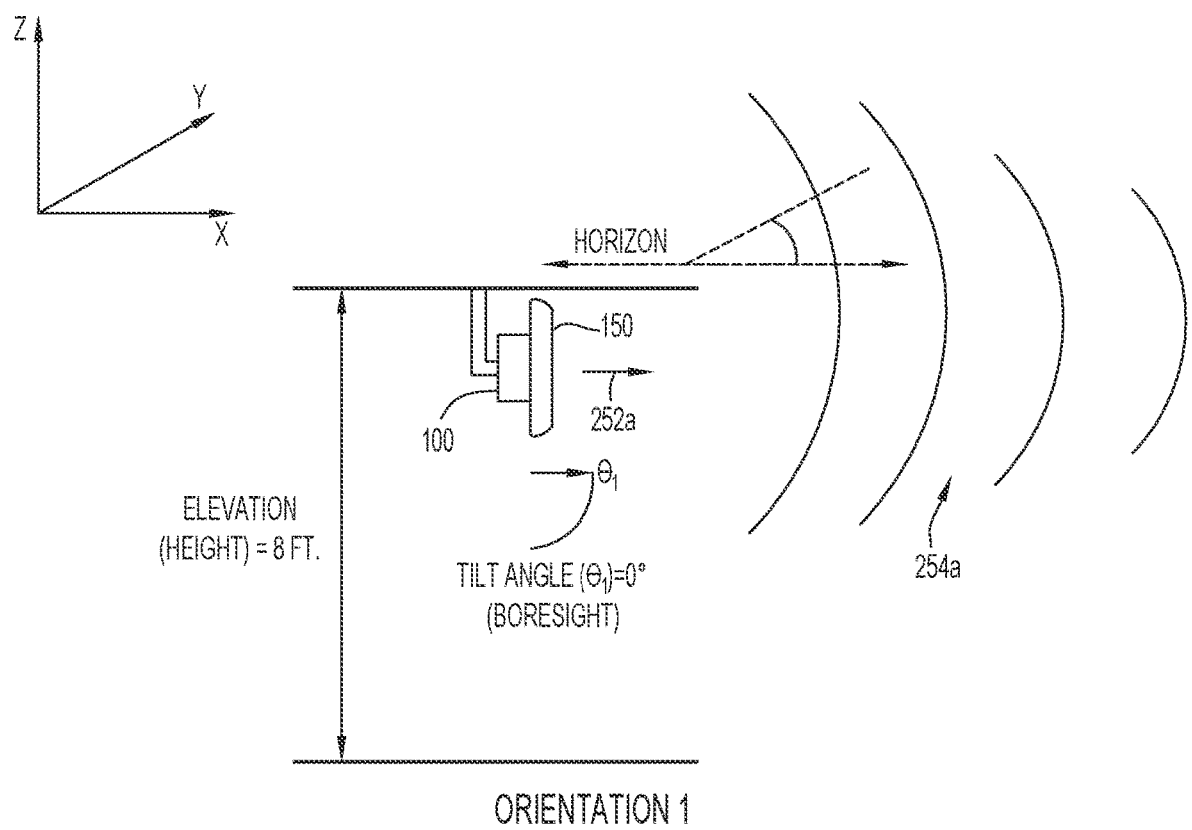
FIGS. 2A, 2B, and 2C show three different orientations of an antenna to illustrate how antenna orientation affects radiated power at various different angles relative to the horizon, according to an example embodiment.
Figure 2B:
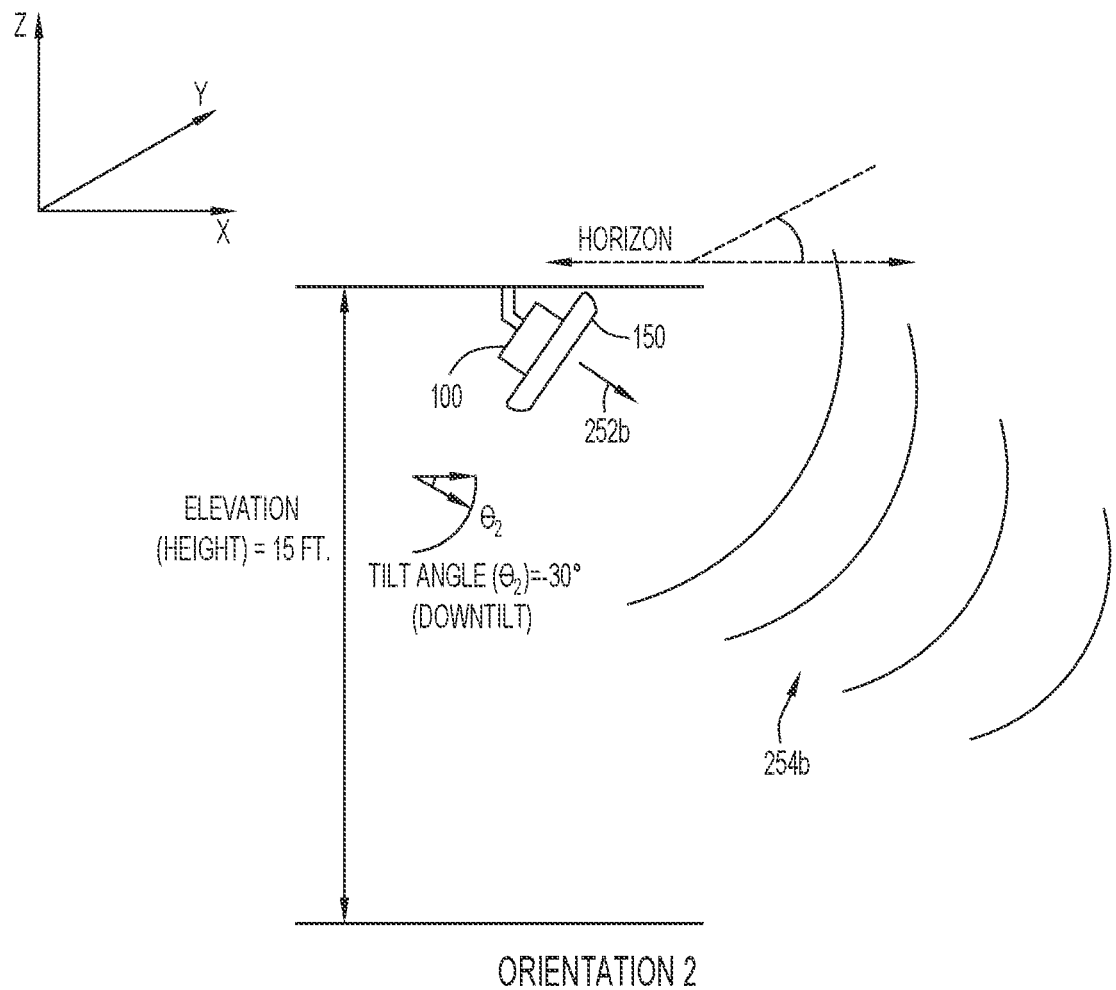
Figure 2C:
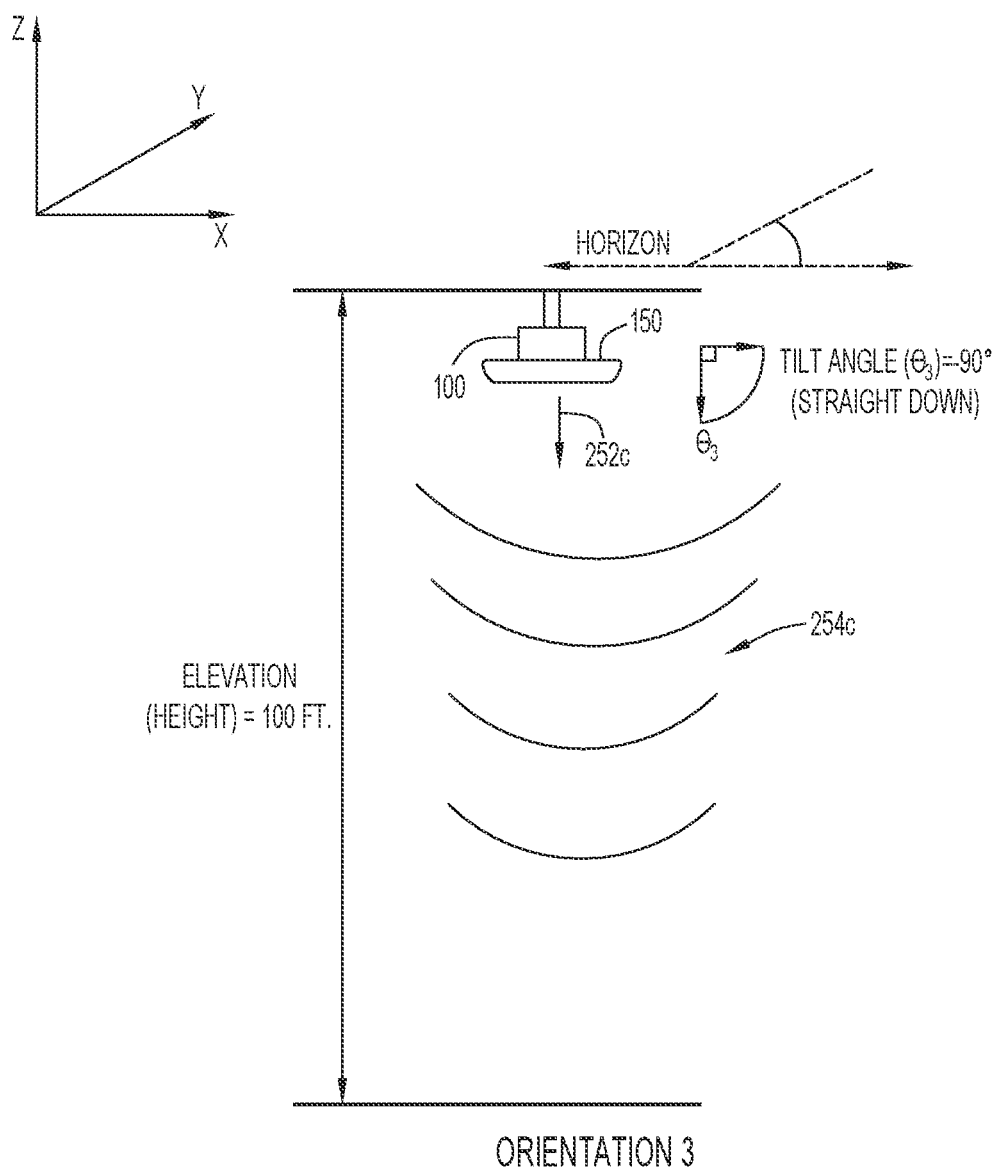

Now referring to FIGS. 2A-2C, to demonstrate the value in adjusting transmit power, the coverage for three common orientation use cases for a 5.15 GHz patch antenna assembly are described: (1) boresight, (2) 30 degree downtilt, and (3) 90 degree downtilt (straight down). For purposes of this example, it is assumed that the antenna assembly 150 has a peak gain (main lobe magnitude) of 9.2 dBi with a 3 dB beamwidth of 63 degrees×64 degrees (azimuth×elevation), although this example should be considered non-limiting and illustrative only.

More specifically, FIG. 2A shows an orientation/tilt and elevation/height for the antenna assembly 150 of apparatus 100 where the antenna assembly 150 has a boresight orientation ($\theta_1=0°$ relative to the horizon) and an elevation of 8 ft. The antenna 150 in FIG. 2A radiates a signal 252a having a radiation pattern 254a in a first direction in relation to the horizon. FIG. 2B shows an example where the antenna assembly 150 has a 30 degrees downtilt orientation ($\theta_2=-30°$ downward tilt angle relative to the horizon) and an elevation of 15 ft. The antenna 150 in FIG. 2B radiates a signal 252b having a radiation pattern 254b in a second direction in relation to the horizon. Finally, FIG. 2C shows an example where the antenna assembly 150 has a 90 degrees downtilt ($\theta_1=-90°$ downward tilt angle relative to the horizon) and an elevation of 100 ft. The antenna 150 in FIG. 2C radiates a signal 252c having a radiation pattern 254c in a third direction in relation to the horizon. Some of the signal 252a (as depicted by its radiation pattern 254a) is shown propagating above the horizon (and even above a predetermined angle (e.g., 30 degrees above the horizon) in FIG. 2A, whereas little of the signal 252b (as depicted by its radiation pattern 254b) shown in FIG. 2B propagates above the horizon, and none of the signal 252c (as depicted by its radiation pattern 254c) shown in FIG. 2C propagates above the horizon line. These examples are intended to be illustrative and non-limiting in nature, and various other orientations (e.g., different downtilt angles between 0 degrees and −30 degrees downtilt, or between −30° downtilt and −90° downtilt) and elevations (heights) are contemplated within the scope of this disclosure.

Figure 3A:
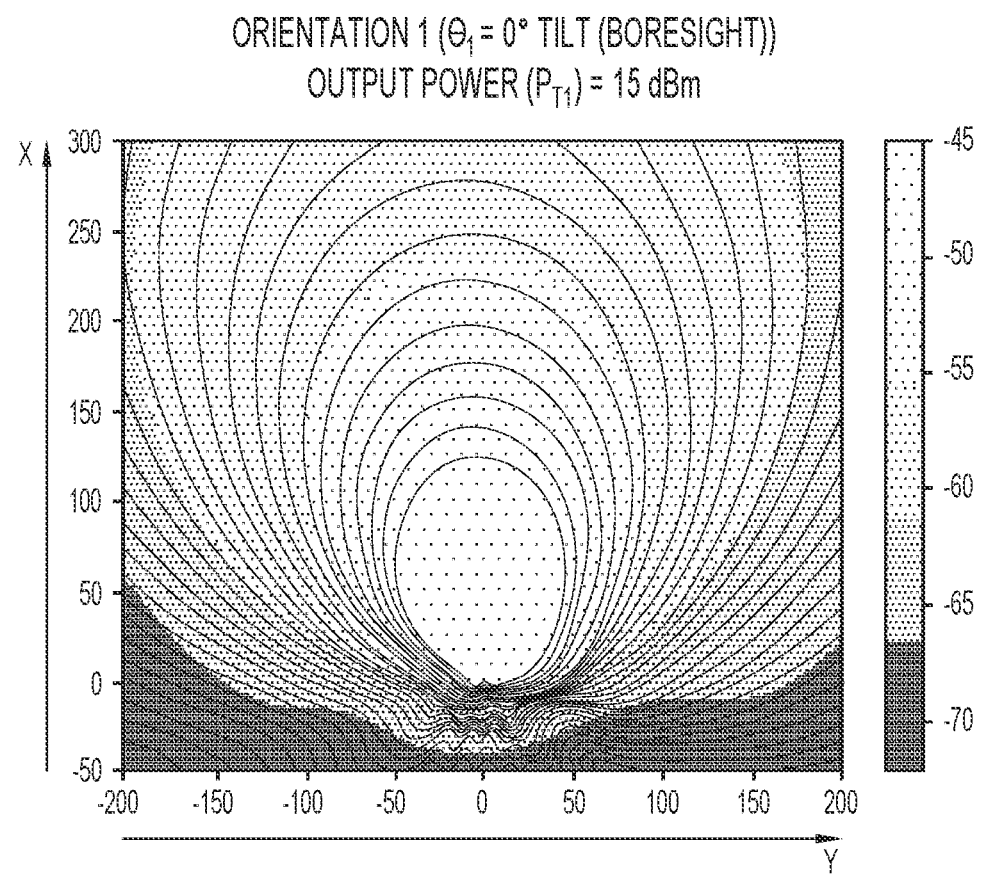
FIGS. 3A-3E show different examples of received signal strength index (RSSI) coverage for antenna orientations like those of FIGS. 2A-2C, according to an example embodiment.
Figure 3B:
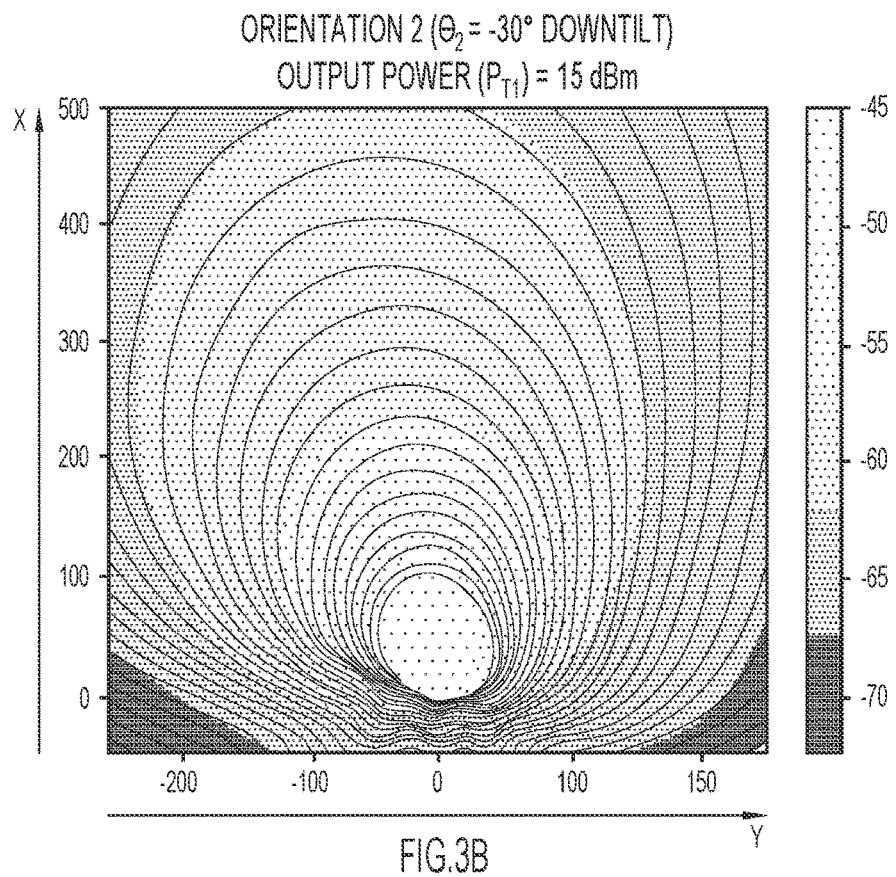
Figure 3C:
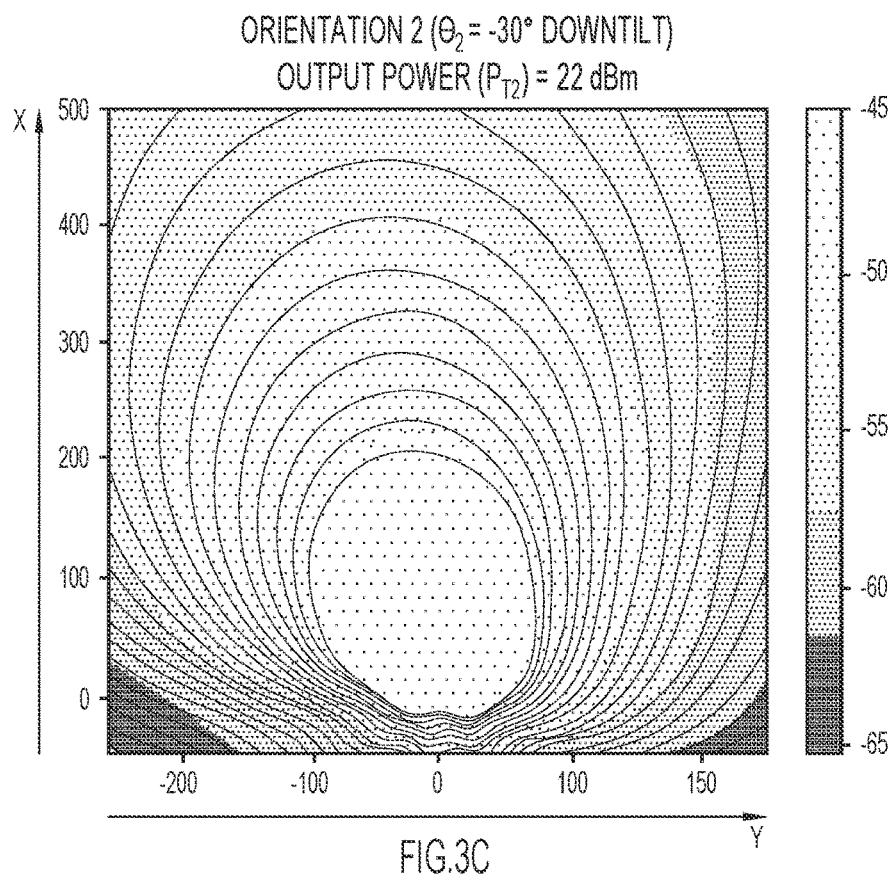
Figure 3D:
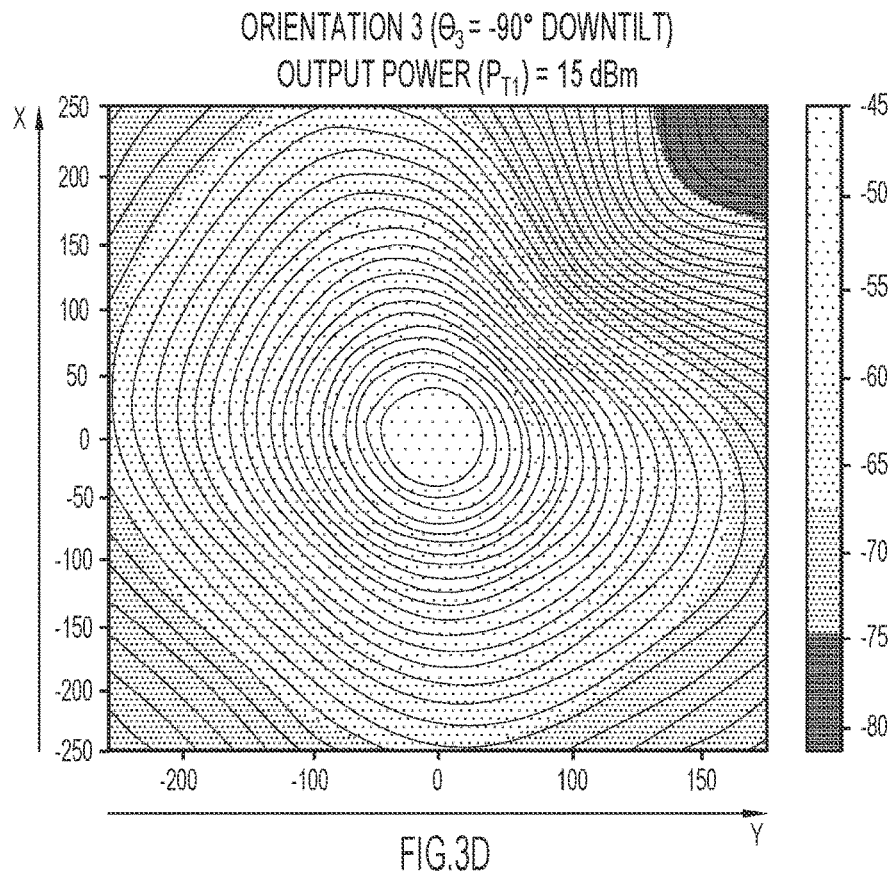
Figure 3E:
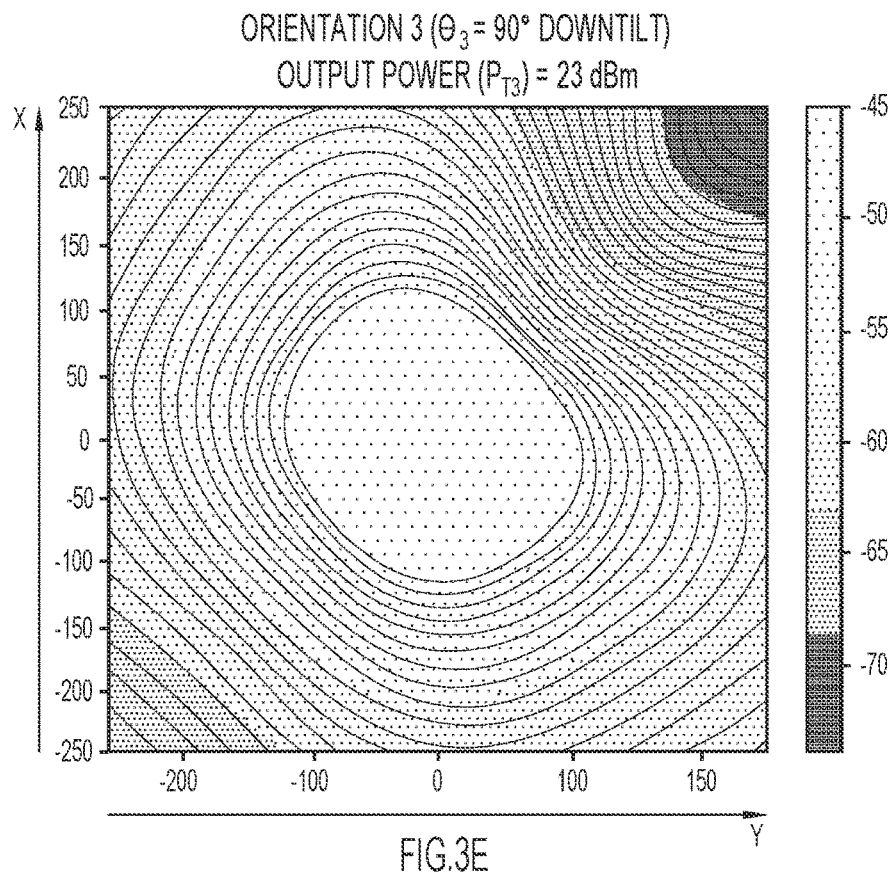

FIGS. 3A-3E show different examples of received signal strength index (RSSI) coverage for the different configurations of a patch antenna that may be used for the antenna assembly 150 (transmitting at a frequency of 5.15 GHz) for various orientations, such as those shown in FIGS. 2A, 2B, and 2C. For example, FIG. 3A shows RSSI coverage for a 0 degree tilt (boresight) orientation and an elevation of 8 ft. with a radio transmit power ($P_{T1}$) of 15 dBm. FIG. 3B shows RSSI coverage for a −30 degrees downtilt orientation and elevation of 15 ft. with the output radio transmit power ($P_{T1}$) of 15 dBm. FIG. 3C shows RSSI coverage for a −30 degrees downtilt orientation and elevation of 15 ft. with a radio transmit power ($P_{T2}$) increased to 22 dBm, according to an example embodiment using the adjustment techniques described herein. FIG. 3D shows RSSI coverage for a −90 degrees downtilt orientation and an elevation of 100 ft. high with the radio transmit power ($P_{T1}$) of 15 dBm. FIG. 3E shows RSSI coverage for a −90 degrees downtilt orientation and elevation of 100 ft. high with a radio transmit power ($P_{T3}$) increased to 23 dBm, according to an example embodiment using the adjustment techniques described herein.

As shown in FIG. 3A, when the orientation/tilt of the antenna 150 is at 0 degrees or boresight (Orientation 1 of FIG. 2A), the gain ($G_{a1}$) of this patch antenna at 30 degrees above the horizon is 6.2 dBi. Therefore, according to FCC 14-30 Section 15.407, the access point's output radio transmit power ($P_{T1}$) can be set to a maximum of 15 dBm (refer to FIG. 3A). In the case of a −30 degree downward tilt angle (Orientation 2 of FIG. 2B), the antenna gain ($G_{a2}$) at 30 degrees above the horizon is −1 dBi. Given this gain value at 30 degrees above the horizon, the output radio transmit power ($P_{T2}$) can be set (increased) to a maximum of 22 dBm (refer to FIG. 3C) according to an example embodiment using the adjustment techniques described herein, rather than 15 dBm (refer to FIG. 3B). In the case of a −90 degree downward tilt angle (Orientation 3 of FIG. 2C), the gain ($G_{a3}$) is less than −10 dBi at 30 degrees above the horizon. In this case the output radio transmit power ($P_{T3}$) can be set (increased) to 23 dBm (refer to FIG. 3E) according to an example embodiment using the adjustment techniques described herein, which is the typical highest transmit power for enterprise Wi-Fi access points, rather than 15 dBm (refer to FIG. 3D).

As demonstrated in FIGS. 3A-3E above, by being able to increase the output radio transmit power ($P_{T2}$, $P_{T3}$) in both the −30 degrees downtilt (Orientation 2 of FIG. 2B and RSSI coverage shown in FIG. 3C) and −90 degrees downtilt cases (Orientation 3 of FIG. 2C and RSSI coverage shown in FIG. 3E) according to example embodiments using the adjustment techniques described herein, the −45 dBm RSSI coverage area can be increased from 100 m² to 200 m². The benefit of adapting the output radio transmit power becomes more substantial as the downtilt angle θ of the antenna 150 is increased (in a downward direction away from the horizon).

Figure 4:
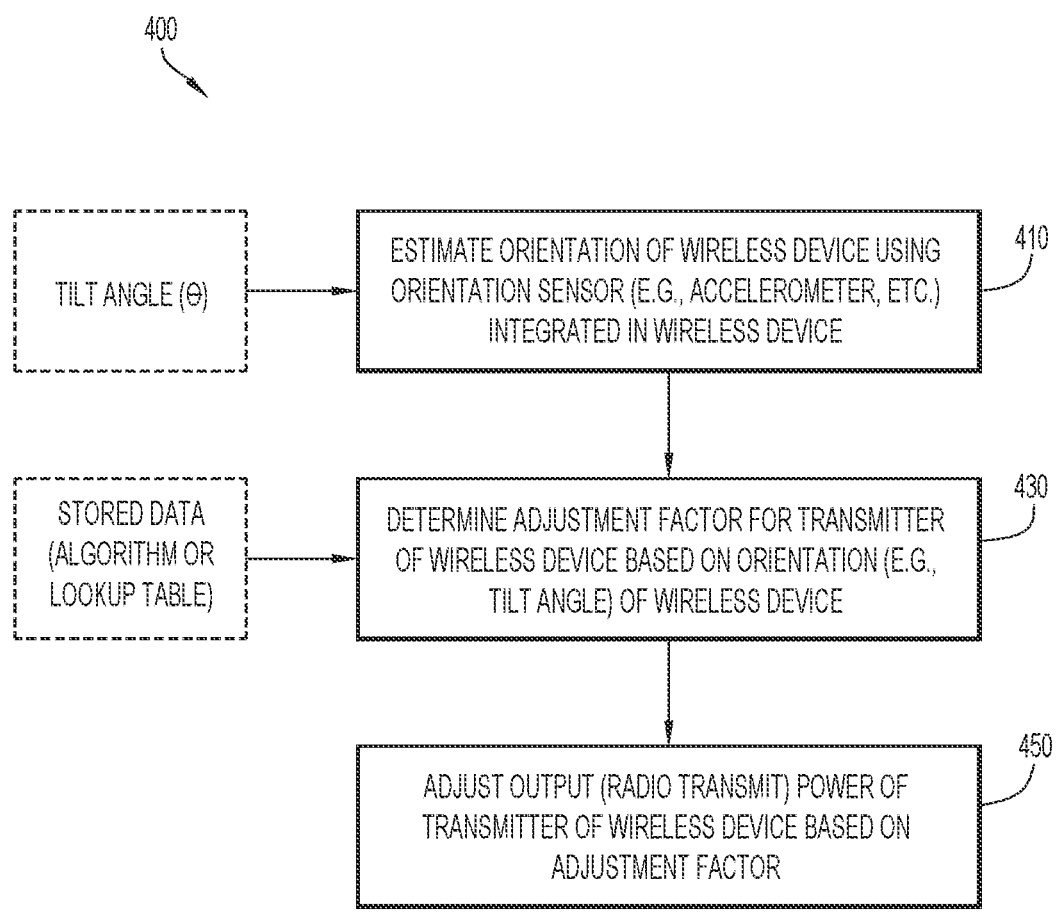
FIG. 4 is a flow chart of a method for adapting radio transmit power based on antenna pattern and elevation tilt measured through an orientation sensor, according to an example embodiment.

FIG. 4 shows a method 400 for adapting radio transmit power based on antenna pattern and elevation tilt measured through an orientation sensor (e.g., accelerometer, etc.), according to an example embodiment. For example, the apparatus 100 (and/or its components) of FIG. 1 may perform functions associated with operations discussed below.

The method 400 includes estimating an orientation of a wireless device using an orientation sensor integrated in or on the wireless device, at step 410. For example, estimating the orientation may include measuring an angle of tilt of an antenna of the wireless device relative to a horizon using the orientation sensor integrated in the wireless device. In some example embodiments, the orientation sensor integrated in the wireless device is an accelerometer. In some other example embodiments, the orientation sensor integrated in the wireless device is a gyroscope, an inertial measurement unit (IMU), or other similar sensor that is configured to measure the angle of tilt of the antenna relative to the horizon.

The method 400 also includes determining an adjustment factor for a transmitter of the wireless device based on the orientation of the wireless device, at step 430. In some example embodiments, determining the adjustment factor may include calculating an adjusted output power of the transmitter of the wireless device based on the angle of tilt of the antenna of the wireless device. In some other example embodiments, determining the adjustment factor may include correlating the angle of tilt of the antenna of the wireless device against stored data describing an antenna pattern of the antenna in an elevation plane (e.g., by referring to a lookup table).

The method 400 further includes adjusting output power of the transmitter of the wireless device based on the adjustment factor, at step 450. For example, adjusting the output power of the transmitter may include increasing the output power of the transmitter of the wireless device based on the angle of tilt of the antenna of the wireless device to maximize a radiated power from the antenna up to a predetermined angle above the horizon. Adjusting the output power of the transmitter of the wireless device in the manner described herein results in a highest allowable EIRP for the wireless device that does not exceed a maximum EIRP value at a predetermined angle above the horizon according to regulatory restrictions.

In a variation of the method described above, the method 400 may further include detecting an elevation of the antenna of the wireless device using an elevation sensor integrated in or on the wireless device, and determining one or more radio frequency (RF) modifications with respect to a target area of the antenna of the wireless device based on the angle of tilt of the antenna and the elevation of the antenna.

Thus, example embodiments described herein provide an adaptive system, via apparatus 100 of FIG. 1 and method 400 of FIG. 4, to optimize the radio transmit power of an access point or other wireless device based on antenna pattern and elevation tilt measured by an accelerometer or other orientation sensor. By measuring this downtilt angle, using an orientation sensor (e.g., accelerometer) in or on the apparatus (access point and/or antenna), and correlating that downtilt angle to the antenna pattern in the elevation plane, the radio transmit power of the apparatus's transmitter can be "upwardly optimized" so as to maximize EIRP while complying with regulations/restrictions (e.g., which are mandated by the FCC in the United States, Industry Canada, and similar authorities in other countries). By integrating the orientation sensor (e.g., accelerometer) that can measure tilt angle, an access point can utilize its measurements to automatically adjust the AP's radio transmit power accordingly. The automation provided by the adaptive system (apparatus 100 and method 400) is designed to ensure compliance with the mandates of various regulatory authorities.

Figure 5:
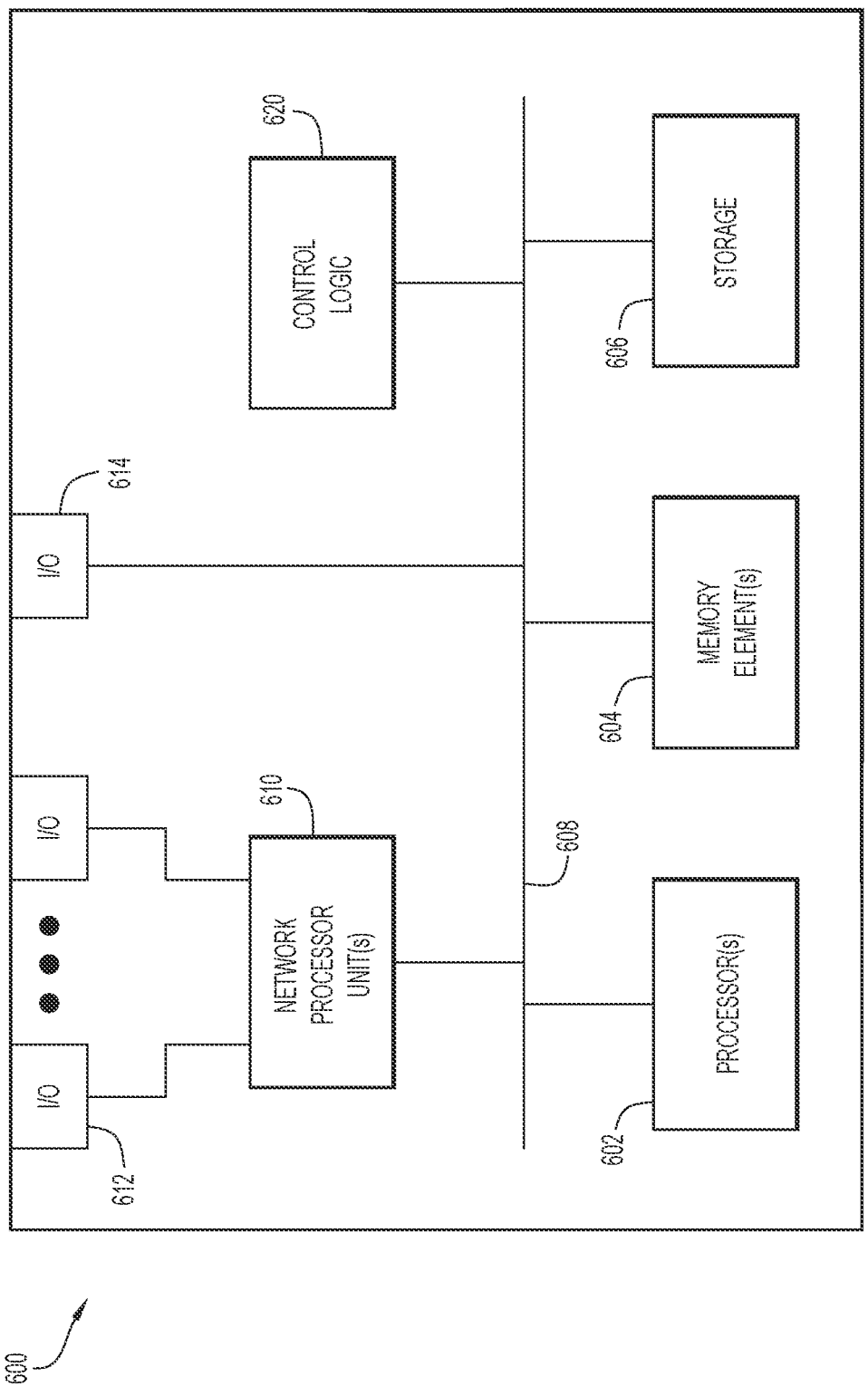
FIG. 5 illustrates a hardware block diagram of an example device that may perform functions associated with operations discussed herein.

Referring to FIG. 5, FIG. 5 illustrates a hardware block diagram of a computing device 600 that may perform functions associated with operations discussed herein in connection with the techniques depicted in FIGS. 1, 2A-2C, 3A-3E, and 4. In various embodiments, a computing device or apparatus, such as computing device 600 or any combination of computing devices 600, may be configured as any entity/entities as discussed for the techniques depicted in connection with FIGS. 1-4 (such the apparatus 100, an access point, or other wireless device) in order to perform operations of the various techniques discussed herein.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a method including estimating an orientation of a wireless device using an orientation sensor integrated in the wireless device, determining an adjustment factor for a transmitter of the wireless device based on the orientation of the wireless device, and adjusting output power of the transmitter of the wireless device based on the adjustment factor.

In some aspects, the techniques described herein relate to a method, wherein estimating the orientation of the wireless device includes measuring an angle of tilt of an antenna of the wireless device relative to a horizon using the orientation sensor integrated in the wireless device.

In some aspects, the techniques described herein relate to a method, wherein the orientation sensor integrated in the wireless device is an accelerometer, a gyroscope, or an inertial measurement unit that is configured to measure the angle of tilt of the antenna relative to the horizon.

In some aspects, the techniques described herein relate to a method, wherein determining the adjustment factor includes calculating an adjusted output power of the transmitter of the wireless device based on the angle of tilt of the antenna of the wireless device.

In some aspects, the techniques described herein relate to a method, wherein determining the adjustment factor includes correlating the angle of tilt of the antenna of the wireless device against stored data describing an antenna pattern of the antenna in an elevation plane.

In some aspects, the techniques described herein relate to a method, wherein adjusting the output power of the transmitter includes increasing the output power of the transmitter of the wireless device based on the angle of tilt of the antenna of the wireless device to maximize a radiated power from the antenna up to a predetermined angle above the horizon.

In some aspects, the techniques described herein relate to a method, wherein adjusting the output power of the transmitter of the wireless device will result in a highest allowable effective isotropic radiated power (EIRP) for the wireless device that does not exceed a maximum EIRP value at a predetermined angle above a horizon according to regulatory restrictions.

In some aspects, the techniques described herein relate to a method, further including detecting an elevation of the antenna of the wireless device using an elevation sensor integrated in the wireless device, and determining one or more radio frequency (RF) modifications with respect to a target area of the antenna of the wireless device based on the angle of tilt of the antenna and the elevation of the antenna.

In some aspects, the techniques described herein relate to an apparatus including an orientation sensor that determines an orientation of the apparatus, a transmitter, and a controller coupled to the orientation sensor and the transmitter, wherein the controller is configured to estimate an orientation of the apparatus using the orientation sensor, determine an adjustment factor for the transmitter based on the orientation, and generate a power adjustment control to adjust output power of the transmitter based on the adjustment factor.

In some aspects, the techniques described herein relate to an apparatus, further including an antenna, wherein the controller is configured to estimate an angle of tilt of the antenna relative to a horizon based on the orientation determined by the orientation sensor.

In some aspects, the techniques described herein relate to an apparatus, wherein the orientation sensor is an accelerometer, a gyroscope, or an inertial measurement unit that is configured to measure the angle of tilt of the antenna relative to the horizon.

In some aspects, the techniques described herein relate to an apparatus, wherein the controller is configured to determine the adjustment factor by calculating an adjusted output power of the transmitter based on the angle of tilt of the antenna.

In some aspects, the techniques described herein relate to an apparatus, wherein the controller is configured to determine the adjustment factor by correlating the angle of tilt of the antenna of the apparatus against stored data describing an antenna pattern of the antenna in an elevation plane.

In some aspects, the techniques described herein relate to an apparatus, wherein the controller is configured to generate the power adjustment control so as to increase the output power of the transmitter based on the angle of tilt of the antenna to maximize a radiated power from the antenna up to a predetermined angle above the horizon.

In some aspects, the techniques described herein relate to an apparatus, wherein the controller is configured to generate the power adjustment control that adjusts the output power of the transmitter to achieve a highest allowable effective isotropic radiated power (EIRP) that does not exceed a maximum EIRP value at a predetermined angle above a horizon according to regulatory restrictions.

In some aspects, the techniques described herein relate to an apparatus, further including an elevation sensor that measures an elevation of the apparatus, wherein the controller is configured to determine an elevation of the antenna based on elevation output by the elevation sensor, and determine one or more radio frequency (RF) modifications with respect to a target area of the antenna based on the angle of tilt of the antenna and the elevation of the antenna.

In some aspects, the techniques described herein relate to a non-transitory computer readable medium storing a program of instructions, which when executed by a processor of a wireless device, cause the wireless device to perform operations including estimating an orientation of the wireless device based on an orientation of the wireless device determined by an orientation sensor in the wireless device, determining an adjustment factor for a transmitter of the wireless device based on the orientation of the wireless device, and adjusting output power of the transmitter of the wireless device based on the adjustment factor.

In some aspects, the techniques described herein relate to a computer readable medium, wherein estimating the orientation of the wireless device includes measuring an angle of tilt of an antenna of the wireless device relative to a horizon using the orientation sensor integrated in the wireless device.

In some aspects, the techniques described herein relate to a computer readable medium, wherein adjusting the output power of the transmitter includes increasing the output power of the transmitter of the wireless device based on the angle of tilt of the antenna of the wireless device to maximize a radiated power from the antenna up to a predetermined angle above the horizon.

In some aspects, the techniques described herein relate to a computer readable medium, wherein adjusting the output power of the transmitter of the wireless device will result in a highest allowable effective isotropic radiated power (EIRP) for the wireless device that does not exceed a maximum EIRP value at a predetermined angle above a horizon according to regulatory restrictions.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   estimating an orientation of a wireless device using an orientation sensor integrated in the wireless device;
   determining an adjustment factor for a transmitter of the wireless device based on the orientation of the wireless device; and
   adjusting output power of the transmitter of the wireless device based on the adjustment factor to increase the output power of the transmitter when the orientation of the wireless device is in a downtilt orientation that lowers an antenna gain above a horizon.

2. The method according to claim 1, wherein estimating the orientation of the wireless device comprises:
   measuring an angle of tilt of an antenna of the wireless device relative to the horizon using the orientation sensor integrated in the wireless device.

3. The method according to claim 2, wherein the orientation sensor integrated in the wireless device is an accelerometer, a gyroscope, or an inertial measurement unit that is configured to measure the angle of tilt of the antenna relative to the horizon.

4. The method according to claim 2, wherein determining the adjustment factor comprises:
   calculating an adjusted output power of the transmitter of the wireless device based on the angle of tilt of the antenna of the wireless device.

5. The method according to claim 2, wherein determining the adjustment factor comprises:
   correlating the angle of tilt of the antenna of the wireless device against stored data describing an antenna pattern of the antenna in an elevation plane.

6. The method according to claim 2, wherein adjusting the output power of the transmitter comprises:
   increasing the output power of the transmitter of the wireless device based on the angle of tilt of the antenna of the wireless device to maximize a radiated power from the antenna up to a predetermined angle above the horizon.

7. The method according to claim 1, wherein adjusting the output power of the transmitter of the wireless device will result in a highest allowable effective isotropic radiated power (EIRP) for the wireless device that does not exceed a maximum EIRP value at a predetermined angle above a horizon according to regulatory restrictions.

8. The method according to claim 2, further comprising:
   detecting an elevation of the antenna of the wireless device using an elevation sensor integrated in the wireless device; and
   determining one or more radio frequency (RF) modifications with respect to a target area of the antenna of the wireless device based on the angle of tilt of the antenna and the elevation of the antenna.

9. An apparatus comprising:
   an orientation sensor that determines an orientation of the apparatus;
   a transmitter; and
   a controller coupled to the orientation sensor and the transmitter, wherein the controller is configured to:
      estimate an orientation of the apparatus using the orientation sensor;
      determine an adjustment factor for the transmitter based on the orientation; and
      generate a power adjustment control to adjust output power of the transmitter based on the adjustment factor to increase the output power of the transmitter when the orientation of the apparatus is in a downtilt orientation that lowers an antenna gain above a horizon.

10. The apparatus according to claim 9, further comprising:
    an antenna,
    wherein the controller is configured to estimate an angle of tilt of the antenna relative to a horizon based on the orientation determined by the orientation sensor.

11. The apparatus according to claim 10, wherein the orientation sensor is an accelerometer, a gyroscope, or an inertial measurement unit that is configured to measure the angle of tilt of the antenna relative to the horizon.

12. The apparatus according to claim 10, wherein the controller is configured to determine the adjustment factor by calculating an adjusted output power of the transmitter based on the angle of tilt of the antenna.

13. The apparatus according to claim 10, wherein the controller is configured to determine the adjustment factor by correlating the angle of tilt of the antenna of the apparatus against stored data describing an antenna pattern of the antenna in an elevation plane.

14. The apparatus according to claim 10, wherein the controller is configured to generate the power adjustment control so as to increase the output power of the transmitter based on the angle of tilt of the antenna to maximize a radiated power from the antenna up to a predetermined angle above the horizon.

15. The apparatus according to claim 9, wherein the controller is configured to generate the power adjustment control that adjusts the output power of the transmitter to achieve a highest allowable effective isotropic radiated power (EIRP) that does not exceed a maximum EIRP value at a predetermined angle above a horizon according to regulatory restrictions.

16. The apparatus according to claim 10, further comprising:
an elevation sensor that measures an elevation of the apparatus,
wherein the controller is configured to:
determine an elevation of the antenna based on elevation output by the elevation sensor; and
determine one or more radio frequency (RF) modifications with respect to a target area of the antenna based on the angle of tilt of the antenna and the elevation of the antenna.

17. A non-transitory computer readable medium storing a program of instructions, which when executed by a processor of a wireless device, cause the wireless device to perform operations comprising:
estimating an orientation of the wireless device based on an orientation of the wireless device determined by an orientation sensor in the wireless device;
determining an adjustment factor for a transmitter of the wireless device based on the orientation of the wireless device; and
adjusting output power of the transmitter of the wireless device based on the adjustment factor to increase the output power of the transmitter when the orientation of the wireless device is in a downtilt orientation that lowers an antenna gain above a horizon.

18. The non-transitory computer readable medium according to claim 17, wherein estimating the orientation of the wireless device comprises:
measuring an angle of tilt of an antenna of the wireless device relative to a horizon using the orientation sensor integrated in the wireless device.

19. The non-transitory computer readable medium according to claim 18, wherein adjusting the output power of the transmitter comprises:
increasing the output power of the transmitter of the wireless device based on the angle of tilt of the antenna of the wireless device to maximize a radiated power from the antenna up to a predetermined angle above the horizon.

20. The non-transitory computer readable medium according to claim 17, wherein adjusting the output power of the transmitter of the wireless device will result in a highest allowable effective isotropic radiated power (EIRP) for the wireless device that does not exceed a maximum EIRP value at a predetermined angle above a horizon according to regulatory restrictions.

21. The method of claim 8, wherein the one or more RF modifications selecting a channel that does not have elevation angle restrictions on maximum radiated power.

* * * * *